United States Patent
Koh et al.

(10) Patent No.: US 8,478,120 B2
(45) Date of Patent: Jul. 2, 2013

(54) CAMERA LENS AND IMAGE CAPTURING DEVICE USING THE SAME

(75) Inventors: Hong-Bin Koh, New Taipei (TW); Tsung-Ken Yang, Hemei Township (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 13/348,112

(22) Filed: Jan. 11, 2012

(65) Prior Publication Data

US 2013/0114949 A1     May 9, 2013

(30) Foreign Application Priority Data

Nov. 4, 2011   (TW) .............................. 100140235 A (51) Int. Cl.
*G03B 3/10*       (2006.01)
*G02B 7/02*       (2006.01)

(52) U.S. Cl.
USPC ......................................... 396/133; 359/823

(58) Field of Classification Search
USPC ..................... 396/79, 133, 529; 348/373–376; 359/699–701, 822–824
See application file for complete search history.

(56) References Cited

U.S. PATENT DOCUMENTS

| 7,146,097 B2 * | 12/2006 | Kameyama | 396/133 |
| 2003/0234986 A1 * | 12/2003 | Takagi et al. | 359/700 |
| 2008/0266675 A1 * | 10/2008 | Chiang | 359/700 |

* cited by examiner

*Primary Examiner* — W B Perkey
*Assistant Examiner* — Minh Phan
(74) *Attorney, Agent, or Firm* — Wang Law Firm, Inc.; Li K. Wang; Stephen Hsu (57) ABSTRACT

A camera lens and an image capturing device using the same. The camera lens comprises a lens-barrel fixing-base, a driving barrel, a focusing lens-barrel and an elastic member. The lens-barrel fixing-base has a hollow part, which has a first supporting part. The first supporting part has a connecting part. The driving barrel has a groove formed at an inner wall of the driving barrel. The focusing lens-barrel has a guiding part, which is inserted into the groove for allowing the focusing lens-barrel to be axially moved in the driving barrel. The focusing lens-barrel has a second supporting part. The elastic member is a hollow-ring structure setting between the lens-barrel fixing-base and the focusing lens-barrel. One end of the elastic member is positioned against the first supporting part and the another end of the elastic member is positioned against the second supporting part.

8 Claims, 5 Drawing Sheets

CAMERA LENS AND IMAGE CAPTURING DEVICE USING THE SAME

CROSS-REFERENCE TO RELATED APPLICATION

This application claims the benefit of priority to Taiwan Patent Application No. 100140235, filed on Nov. 4, 2011, in the Taiwan Intellectual Property Office, the disclosure of which is incorporated herein in its entirety by reference.

BACKGROUND OF THE INVENTION

1. Field of the Invention

The present invention relates to a camera lens, in particular to the camera lens and the image capturing device using the same that improve the focus accuracy by an elastic member.

2. Description of the Related Art

At present, most cameras available in the market come with a zooming function and a focusing function. Most cameras achieve the zooming or focusing effect by disposing a groove inside a lens barrel and a guiding part outside another lens barrel for inserting into the groove. By the rotation of the lens barrel or the other lens barrel, one of the lens barrels move axially to change a distance between the two lens barrels, so as to complete an operation of zooming or focusing.

However, there is an issue of a backlash occurred between the groove and the guiding part (such as a groove having a width greater than the width of the guiding part). As to the assembling process, the backlash can simplify the assembling process of inserting the guiding part into the groove; however, as to the component production, the dimensions of the components cannot be controlled precisely, and there may be an issue of error and tolerance that constitute the backlash problem between the groove and the guiding part. After the zooming or focusing operation is finished, the backlash between the groove and the guiding part plus the weight of components drive the guiding part to lean against a certain side of the groove, so that an error of the zooming or focusing that has been completed may result. As to the increasingly stricter requirement for the focus accuracy nowadays, the backlash problem between the groove and the guiding part is obviously a major obstacle.

To overcome the aforementioned problem, some cameras adopt a design of disposing a spring between the zooming lenses to improve the accuracy of the zooming operation of the lenses. However, the design of disposing a spring between the zooming lenses provides a better chance of receiving and reflecting light, so as to produce a flare phenomenon. In addition, the disposition of the spring also increases the complexity of assembling process.

In view of the shortcomings of the prior art, the inventor of the present invention designed a camera lens and an image capturing device using the same to overcome the shortcomings of the prior art and enhance the industrial application.

SUMMARY OF THE INVENTION

In view of the aforementioned problems of the prior art, it is a primary objective of the present invention to provide a camera lens and an image capturing device using the same to solve the problem of focusing accuracy caused by the backlash occurred between the groove and the guiding part of the conventional camera lens.

To achieve the aforementioned objective, the present invention provides a camera lens, comprising: a lens-barrel fixing base, a driving barrel, a focusing lens-barrel and an elastic member. The lens-barrel fixing base has a hollow part formed at a central position of the lens-barrel fixing base, and the hollow part has a first supporting part formed at a peripheral area of the hollow part, and the first supporting part has a connecting part formed at an external periphery of the first supporting part. The driving barrel is a hollow barrel structure, having a groove formed at an inner wall of the driving barrel, and the driving barrel is installed in a fixing barrel, wherein an end of the fixing barrel is coupled to the connecting part. The focusing lens-barrel is a hollow barrel structure, having a guiding part formed on an external wall of the focusing lens-barrel. The guiding part is inserted into the groove, such that the focusing lens-barrel can be disposed and axially moved in the driving barrel. A second supporting part is disposed at an inner wall of the focusing lens-barrel. The elastic member is a hollow-ring structure, which can be axially extended and contracted. The elastic member is disposed between the lens-barrel fixing base and the focusing lens-barrel, and one end of the elastic member supports the first supporting part of the lens-barrel fixing base, and another end of the elastic member supports the second supporting part of the focusing lens-barrel. Wherein, a radial cross-sectional area at one end of the elastic member is greater than a radial cross-sectional area at the another end of the elastic member.

Preferably, the camera lens may support the focusing lens-barrel through the elastic member, such that the guiding part of the focusing lens-barrel is positioned closely against a side of the groove of the driving barrel.

Preferably, the elastic member may be a spring.

Preferably, the another end of the elastic member may be fixed to the second supporting part of the focusing lens-barrel.

Preferably, the elastic member has a non-stretched length greater than a distance between the first supporting part of the lens-barrel fixing base and the second supporting part of the focusing lens-barrel.

Preferably, the one end of the elastic member may be fixed to the first supporting part of the lens-barrel fixing base.

Preferably, the elastic member has a non-stretched length smaller than the distance between the first supporting part of the lens-barrel fixing base and the second supporting part of the focusing lens-barrel.

Preferably, when the driving barrel is moved and rotated clockwise or counterclockwise, the guiding part of the focusing lens-barrel is moved along the groove to drive the focusing lens-barrel to move for a focusing operation.

To achieve the aforementioned objective, the present invention further provides an image capturing device comprising a camera lens, a zooming lens-barrel and an image sensor. The camera lens comprises: a lens-barrel fixing base, a driving barrel, a focusing lens-barrel and an elastic member. The lens-barrel fixing base has a hollow part formed at a central position of the lens-barrel fixing base. A first supporting part is formed in a peripheral area of the hollow part, and a connecting part is formed at an external periphery of the first supporting part. A driving barrel is a hollow barrel structure, having a groove formed at an inner wall of the driving barrel. The driving barrel is disposed in a fixing barrel, and one end of the fixing barrel is coupled to the connecting part. A focusing lens-barrel is a hollow barrel structure, having a guiding part formed at an external wall of the focusing lens-barrel and inserted into the groove, such that the focusing lens-barrel can be disposed and axially moved in the driving barrel. In addition, a second supporting part is formed at an inner wall of the focusing lens-barrel. An elastic member is a hollow-ring structure, which can be axially extended and contracted. The elastic member is disposed between the lens-barrel fixing base and the focusing lens-barrel. One end of the elastic member supports the first supporting part of the lens-barrel fixing base, and the another end of the elastic member supports the second supporting part of the focusing lens-barrel. Additionally, the radial cross-sectional area at the one end of the elastic member is greater than the radial cross-sectional area at the another end of the elastic member.

The zooming lens-barrel is disposed in the driving barrel and located at one end of the focusing lens-barrel and away from the lens-barrel fixing base. The image sensor is disposed at the first supporting part of the lens-barrel fixing base and surrounded by the elastic member.

Preferably, the camera lens may support the focusing lens-barrel through the elastic member, such that the guiding part the focusing lens-barrel is positioned against a side of the groove of the driving barrel.

Preferably, the elastic member is a spring.

Preferably, the another end of the elastic member is fixed to the second supporting part.

Preferably, the elastic member has a non-stretched length greater than a distance between the first supporting part of the lens-barrel fixing base and the second supporting part of the focusing lens-barrel.

Preferably, one end of the elastic member is fixed to the first supporting part of the lens-barrel fixing base.

Preferably, the elastic member has a non-stretched length smaller than the distance between the first supporting part of the lens-barrel fixing base and the second supporting part of the focusing lens-barrel.

Preferably, when the driving barrel is driven to move and rotate clockwise or counterclockwise by a driving module, the guiding part of the focusing lens-barrel is moved along the groove to drive the focusing lens-barrel to move for a focusing operation.

In summation, the camera lens and the image capturing device using the same in accordance with the present invention have one or more of following advantages:

(1) The camera lens and the image capturing device using the same adopt an elastic member disposed between the lens-barrel fixing base and the focusing lens-barrel, so that the guiding part of the focusing lens-barrel is positioned closely against a side of the groove of the driving barrel to improve the focus accuracy.

(2) The camera lens and the image capturing device using the same adopt an elastic member disposed between the lens-barrel fixing base and the focusing lens-barrel to reduce the chance of the elastic member to receive light, so as to reduce the flare phenomenon.

(3) The camera lens and the image capturing device using the same adopt an elastic member with one end having a smaller radial cross-sectional area fixed to the second supporting part of the focusing lens-barrel to simplify the assembling procedure.

DETAILED DESCRIPTION OF THE PREFERRED EMBODIMENTS

The technical characteristics of the present invention will become apparent with the detailed description of the preferred embodiments accompanied with the illustration of related drawings as follows. It is noteworthy to point out that the drawings are provided for the purpose of illustrating the present invention, but they are not necessarily drawn according to the actual scale, or are intended for limiting the scope of the invention.

The camera lens in accordance with the present invention primarily adopts a elastic member to improve the backlash problem between the groove and the guiding part, and the camera lens is applicable for an image capturing device such as a digital camera, a Smartphone with camera, a digital single-lens reflex camera or a camera lens of a replaceable lens type camera. However, the scope of the invention is not limited to those mentioned above only.

Figure 1:
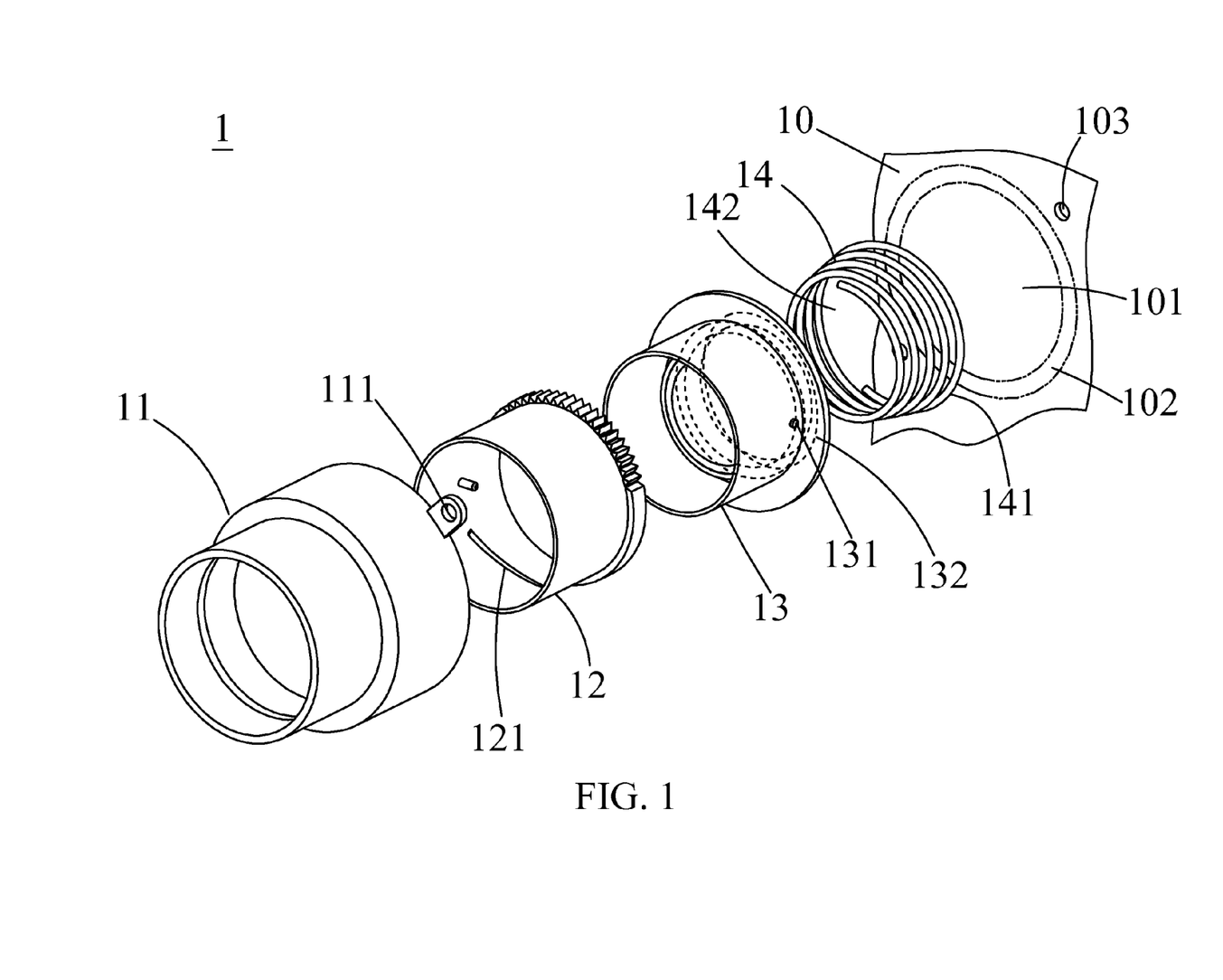
FIG. 1 is an exploded view of a camera lens in accordance with a first preferred embodiment of the present invention.
Figure 2:
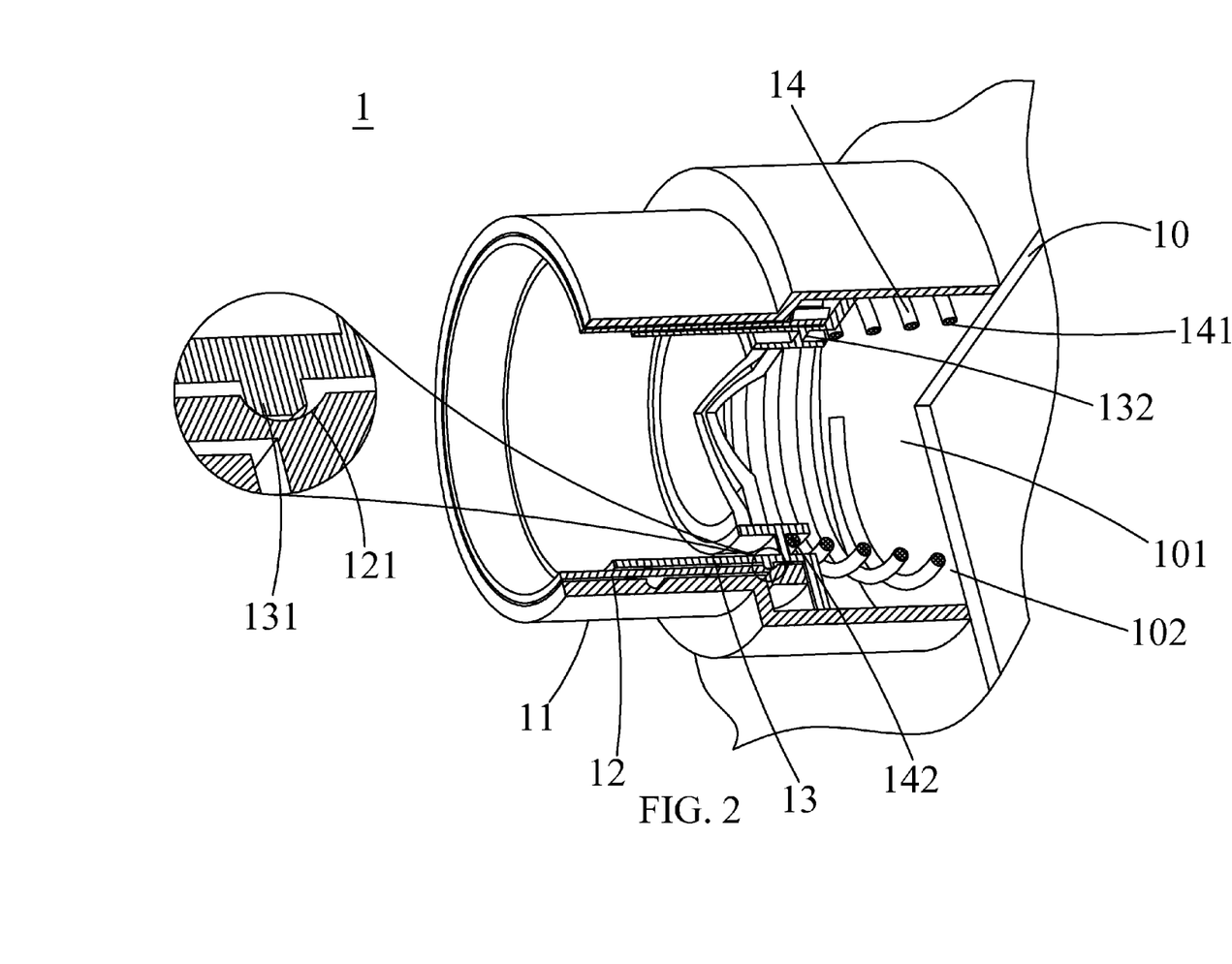
FIG. 2 is a perspective view of a camera lens in accordance with the first preferred embodiment of the present invention.

With reference to FIGS. 1 and 2 for an exploded view and a perspective view of a camera lens in accordance with the first preferred embodiment of the present invention respectively, the camera lens 1 comprises a lens-barrel fixing base 10, a fixing barrel 11, a driving barrel 12, a focusing lens-barrel 13 and an elastic member 14. Wherein, the lens-barrel fixing base 10 has a hollow part 101 formed at a central position of the lens-barrel fixing base 10, a first supporting part 102 formed in a peripheral area of the hollow part 101, and a connecting part 103 formed at an external periphery of the first supporting part 102. A joint part 111 is formed at one end of the fixing barrel 11 and coupled to the connecting part 103. The driving barrel 12 is a hollow barrel structure disposed in the fixing barrel 11 and having a groove 121 formed at an inner wall of the driving barrel 12. The focusing lens-barrel 13 is a hollow barrel structure disposed in the driving barrel 12 and having a guiding part 131 formed on an external wall. The guiding part 131 is embedded into the groove 121, such that the focusing lens-barrel 13 can be disposed and axially moved in the driving barrel 12, and has a second supporting part 132 disposed at an inner wall of the focusing lens-barrel 13. The elastic member 14 is a hollow-ring structure axially extendible and contractible, and the elastic member 14 is disposed between the lens-barrel fixing base 10 and the focusing lens-barrel 13. One end 141 of the elastic member 14 supports the first supporting part 102 of the lens-barrel fixing base 10, and the another end 142 of the elastic member 14 supports the second supporting part 132 of the focusing lens-barrel 13. The radial cross-sectional area at the end 141 is greater than the radial cross-sectional area at the another end 142.

When the driving barrel 12 is moved and rotated clockwise or counterclockwise, the guiding part 131 of the focusing lens-barrel 13 is embedded into the groove 121 of the driving barrel 12, so as to drive the guiding part 131 to move along the shape of the groove 121 to further drive the focusing lens-barrel 13 to move axially for a focusing operation. It is noteworthy to point out that the axial movement of the focusing lens-barrel 13 is a movement of the focusing lens-barrel 13 along the optical axis for increasing or decreasing a distance between the focusing lens-barrel 13 and the image plane to adjust the light of the image of the object to be focused clearly on the image plane.

In the groove 121 of the driving barrel 12 and the guiding part 131 of the focusing lens-barrel 13 mentioned above, most grooves 121 come with a width slightly greater than the width of the guiding part 131 to facilitate the convenience of the assembling process and the component production, and thus a backlash problem exists. The camera lens 1 supports the focusing lens-barrel 13 through the elastic member 14, so that the guiding part 131 of the focusing lens-barrel 13 is positioned closely against one side of the groove 121 of the driving barrel 12. Wherein, the elastic member 14 can be a spring, preferably a conical spring having two sizes for the openings. In addition, the conical spring has the character to be compressed completely till the thickness is equal to the wire diameter, so that the distance between the lens-barrel fixing base 10 and the focusing lens-barrel 13 can be designed to a minimal value to achieve the goal of compact design of the product. In addition, the elastic member 14 can be processed with a non-reflective treatment, such as blackening or coating with black zinc, to further reduce the chance of having a flare phenomenon caused by a reflection of the elastic member 14 and occurred in the camera lens 1.

Wherein, the elastic member 14 has a non-stretched length greater than the distance between the first supporting part 102 of the lens-barrel fixing base 10 and the second supporting part 132 of the focusing lens-barrel 13. After the camera lens 1 is assembled, the elastic member 14 is compressed axially, and the resilience of the elastic member 14 drives the focusing lens-barrel 13 to be supported by the elastic member 14, so that the guiding part 131 of the focusing lens-barrel 13 is positioned closely against a side of the groove 121 of the driving barrel 12 deviated to the object to be photographed. During the assembling process, the another end 142, which is the end with the smaller radial cross-sectional area, of the elastic member 14 is fixed to the second supporting part 132 of the focusing lens-barrel 13. Assemblers can hold the parts of the driving barrel 12 and the focusing lens-barrel 13 easily to support an end 141, which is the end with the larger radial cross-sectional area, of the elastic member 14 against the first supporting part 102 of the lens-barrel fixing base 10 directly to complete the assembling process. In addition, if the elastic member 14 is a spring, parameters such as the wire diameter, the number of coils, the coefficient of elasticity and the compression of the spring can be used to calculate the resilience of the elastic member 14. The resilience can be used for adjusting the appropriate force of supporting the focusing lens-barrel 13 to prevent a too-large force of the elastic member 14 exerting on the focusing lens-barrel 13 that results in an unsmooth movement during focusing or a failure of the focusing operation. The way of fixing the elastic member 14 can be achieved by closely fitting-up or clasping. In this preferred embodiment, the closely fitting-up method is used for illustrating the invention, but the invention is not limited to such arrangement only.

Figure 3:
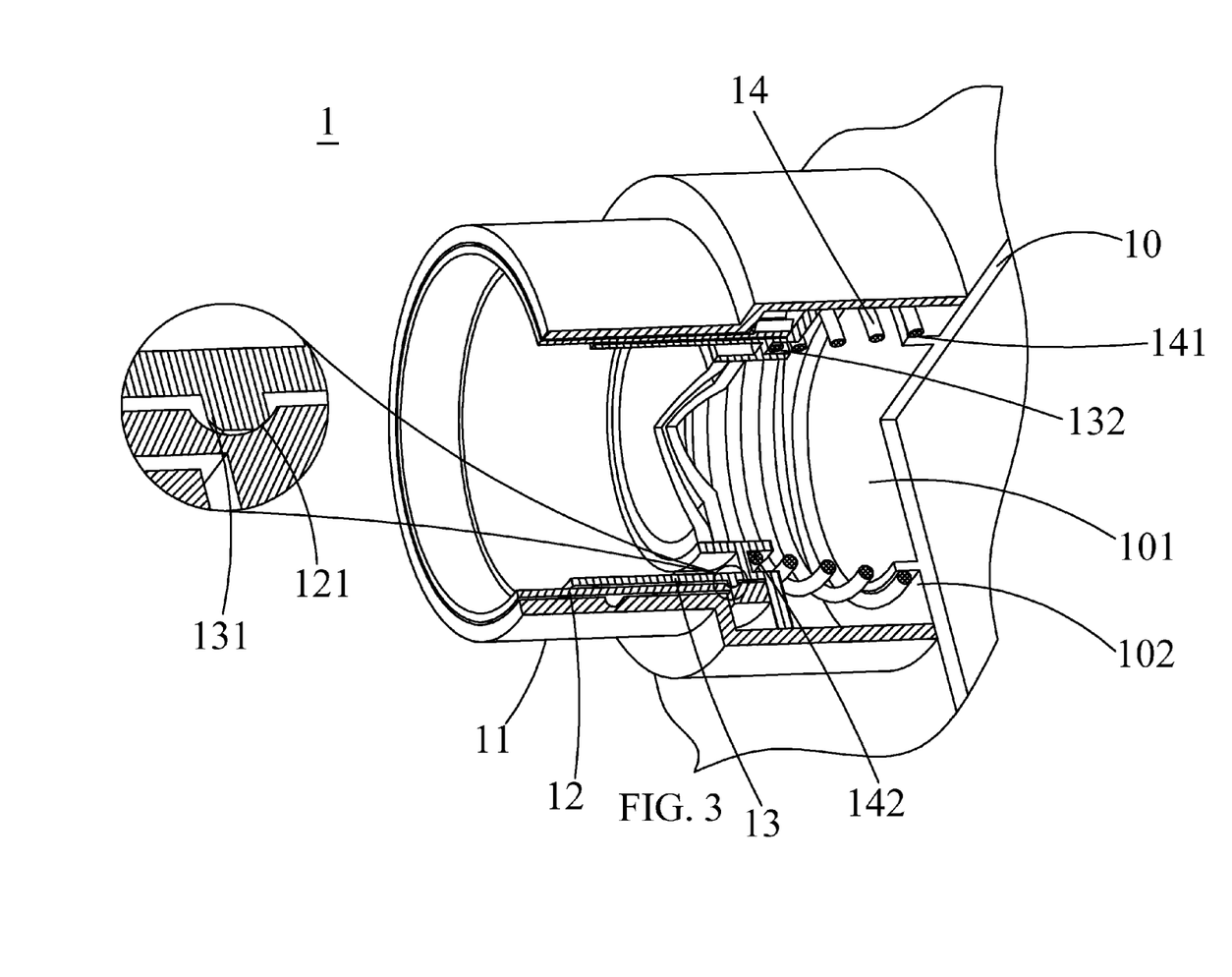
FIG. 3 is a schematic view of a camera lens in accordance with a second preferred embodiment of the present invention.

With reference to FIG. 3 for a schematic view of a camera lens in accordance with the second preferred embodiment of the present invention, the connection and operation of the camera lens 1 are the same as described above, and thus will not be described again. In FIG. 3, the elastic member 14 has a non-stretched length smaller than the distance between the first supporting part 102 of the lens-barrel fixing base 10 and the second supporting part 132 of the focusing lens-barrel 13. During the assembling process, an end 141, which is the end with a larger radial cross-sectional area, of the flexible member 14 is fixed to the first supporting part 102 of the lens-barrel fixing base 10, and the another end 142, which is the end with a smaller radial cross-sectional area, of the flexible member 14 is fixed to the second supporting part 132 of the focusing lens-barrel 13. After the camera lens 1 is assembled, the elastic member 14 is stretched axially, and the resilience of the elastic member 14 can be used to drive the focusing lens-barrel 13 to be pulled in a direction towards the lens-barrel fixing base 10, such that the guiding part 131 of the focusing lens-barrel 13 is positioned closely against a side of the groove 121 of the driving barrel 12 deviated towards the lens-barrel fixing base 10. Preferably, the elastic member 14 can be processed with a non-reflective treatment, such as blackening or coating with black zinc, to further reduce the chance of having a flare phenomenon caused by the reflection of the elastic member 14 and occurred in the camera lens 1.

Figure 4:
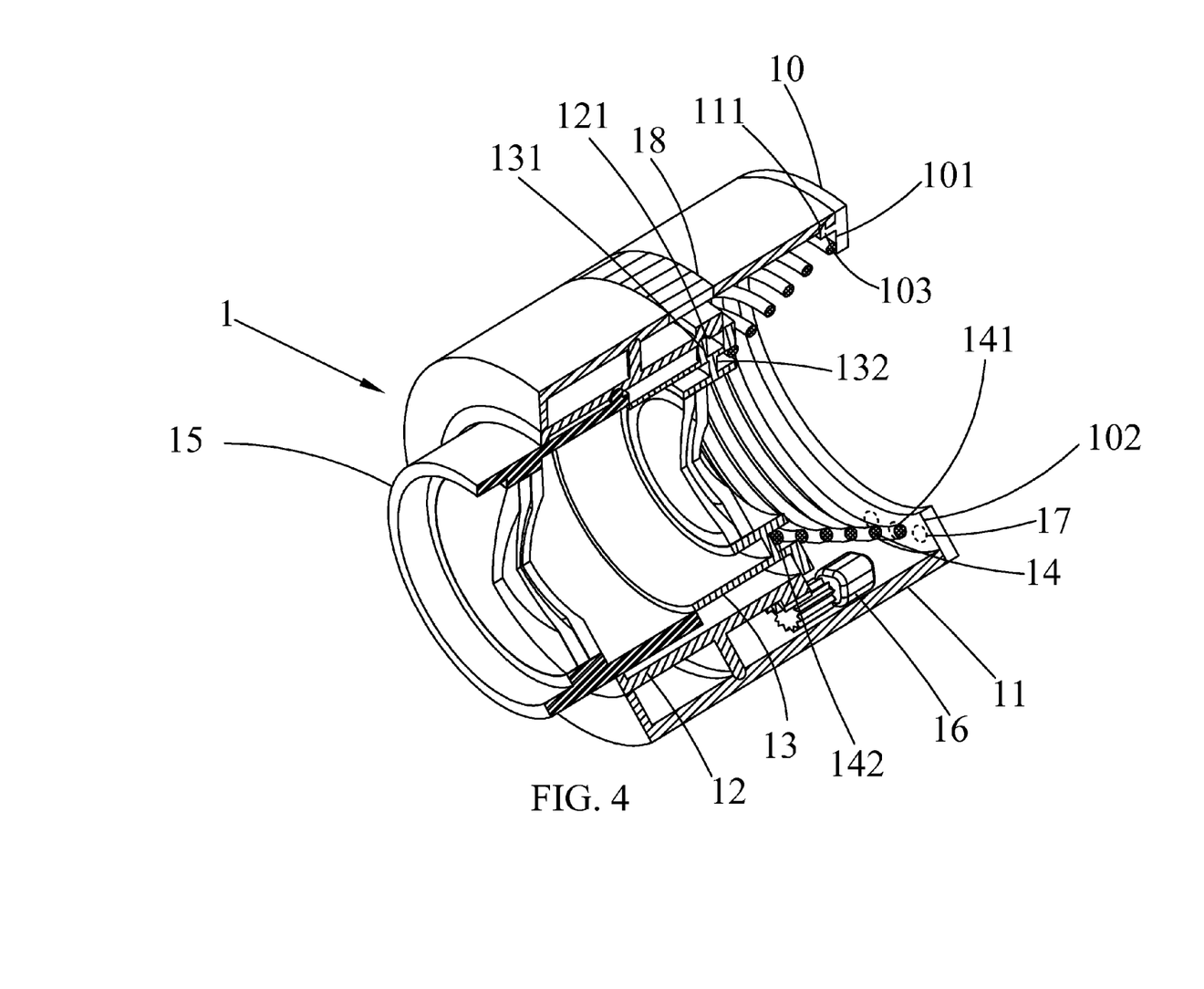
FIG. 4 is a schematic view of a camera lens in accordance with a third preferred embodiment of the present invention.

With reference to FIG. 4 for a schematic view of a camera lens in accordance with the third preferred embodiment of the present invention, the connection and operation of the camera lens 1 are the same as described above, and thus will not be described again. As shown in the figure, the camera lens 1 can be a camera lens of a replaceable lens type camera (not shown in the figure), and the camera lens 1 further comprises a zooming lens-barrel 15, a driving module 16 and a plurality of control contacts 17. Wherein, the zooming lens-barrel 15 is disposed in the driving barrel 12 and located at one end of the focusing lens-barrel 13 and away from the lens-barrel fixing base 10. The driving module 16 can be disposed in a camera lens or a replaceable lens type camera for driving the driving barrel 12 to rotate clockwise or counterclockwise. The driving module 16 can be a mini motor or an ultrasound motor commonly used in the replaceable lens. The plurality of control contacts 17 is disposed on one side of the lens-barrel fixing base 10 away from the elastic member 14 and electrically coupled to the driving module 16. The plurality of control contacts 17 is provided for electrically coupling the driving module 16 and the replaceable lens type camera, so that a user can use a control button (not shown in the figure) of the replaceable lens type camera to control the driving module 16 to drive the driving barrel 12 to rotate clockwise or counterclockwise for a focusing operation.

Preferably, the camera lens 1 may further dispose a manual ring 18 with a serrated structure (not shown in the figure) formed on an inner wall of the manual ring 18 The external wall of the driving barrel 12 has an engraved mark or another serrated structure corresponding to the serrated structure of the manual ring 18, such that they can be geared with each other, and the manual ring 18 is provided to be rotated manually in a clockwise or counterclockwise direction to complete the focusing operation by a user. When the user uses the control button of the replaceable lens type camera to control the driving module 16 or the manual ring 18 to drive the driving barrel 11 to rotate clockwise or counterclockwise, the end 141 of the elastic member 14 supports the first supporting part 102 of the lens-barrel fixing base 10, and the another end 142 of the elastic member 14 supports the second supporting part 132 of the focusing lens-barrel 13, so that the lens-barrel fixing base 10 and the focusing lens-barrel 13 are positioned closely and respectively to the image plane and the object to be photographed, and the guiding part 131 of the focusing lens-barrel 13 is positioned closely to one side of the groove 121 of the driving barrel 12 deviated towards the object to be photographed. After the focusing operation is finished, the elastic member 14 continues supporting the lens-barrel fixing base 10 and the focusing lens-barrel 13, so that the guiding part 131 of the focusing lens-barrel 13 remains positioned closely to one side of the groove 121 of the driving barrel 12 deviated towards the object to be photographed to overcome the backlash problem between the guiding part 131 and the groove 121 of the driving barrel 12, so as to prevent the focusing lens-barrel 13 from continuing moving after the focusing operation is finished.

Figure 5:
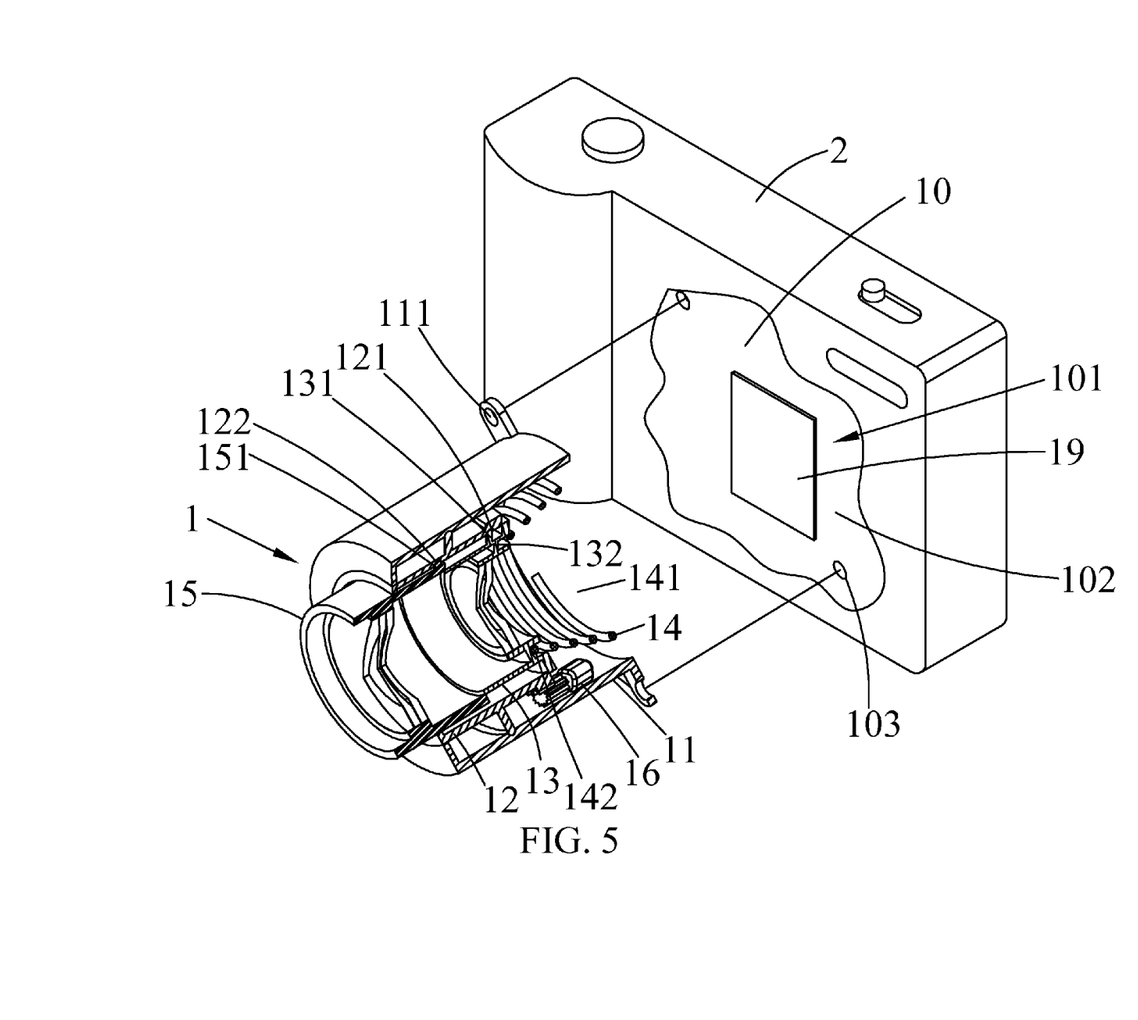
FIG. 5 is a schematic view of an image capturing device of a camera lens in accordance with the present invention.

With reference to FIG. 5 for a schematic view of an image capturing device of a camera lens in accordance with the present invention, the connection and operation of the camera lens 1 of this preferred embodiment are the same as those of the aforementioned preferred embodiments, and thus will not be described again. The image capturing device 2 comprises a camera lens 1, a zooming lens-barrel 15, a driving module 16 and an image sensor 19. Wherein, the zooming lens-barrel 15 is disposed in the driving barrel 12 and located at one end of the focusing lens-barrel 13 and at a position away from the lens-barrel fixing base 10. Preferably, the driving barrel 12 has a zooming groove 122 formed at an inner wall of the driving barrel 12, and the zooming lens-barrel 15 has a zooming guiding part 151 formed at an external wall of the zooming lens-barrel 15, and the zooming guiding part 151 is embedded into the zooming groove 122. When the driving barrel 12 is rotated clockwise or counterclockwise, the zooming guiding part 151 is moved along the shape of the zooming groove 122 for a zooming operation. The driving module 16 may be disposed in the camera lens 1 or the image capturing device 2. The driving module 16 drives the driving barrel 12 to rotate clockwise or counterclockwise, so that the guiding part 131 can be moved along the shape of the groove 121 to further drive the focusing lens-barrel 13 to move axially for a focusing operation. Wherein, the driving module 16 can be a direct current (DC) motor or a stepper motor, and a control module (not shown in the figure) is further provided for controlling the operation of the motor, so as to drive the driving barrel 12 to rotate clockwise or counterclockwise for performing a zooming or focusing operation. The image sensor 19 is disposed at the first supporting part 102 of the lens-barrel fixing base 10 and surrounded by the elastic member 14. The image sensor 19 can be a charge-coupled device (CCD) or a complementary metal-oxide-semiconductor (CMOS) sensor for sensing the light of an image of an object to be photographed and capturing the object to be photographed.

As described above, the elastic member 14 is disposed between the lens-barrel fixing base 10 and the focusing lens-barrel 13. The elastic member 14 has a non-stretched length greater than the distance between the first supporting part 102 of the lens-barrel fixing base 10 and the second supporting part 132 of the focusing lens-barrel 13. Thus, the elastic member 14 supports both ends respectively to drive the lens-barrel fixing base 10 and the focusing lens-barrel 13 to be positioned closely to positions away from both ends of the elastic member 14, so that the guiding part 131 of the focusing lens-barrel 13 is positioned closely to one side of the groove 121 of the driving barrel 12. When the driving module 16 drives the driving barrel 12 to rotate clockwise or counterclockwise for performing and finishing the focusing operation, the elastic member 14 has positioned the guiding part 131 of the focusing lens-barrel 13 closely to one side of the groove 121 of the driving barrel 12. Therefore, after the focusing operation is finished, the focusing lens-barrel 13 will not move further due to the backlash produced between the guiding part 131 of the focusing lens-barrel 13 and the groove 121 of the driving barrel 12, so as to improve the focus accuracy and form an image of the object to be photographed onto the image sensor 19 appropriately.

In summation of the description above, the camera lens and the image capturing device using the same adopt an elastic member disposed between the lens-barrel fixing base and the focusing lens-barrel. Wherein, the elastic member has a non-stretched length greater than or smaller than the distance between the first supporting part of the lens-barrel fixing base and the second supporting part of the focusing lens-barrel. Thus, after the elastic member is compressed or stretched, the resilience of the elastic member positions the guiding part of the focusing lens-barrel closely to one side of the groove of the driving barrel to overcome the problem of having a displacement of the focusing lens-barrel caused by the backlash of the guiding part and the groove after the focusing operation is finished in order to improve the focus accuracy. In addition, the elastic member is disposed between the lens-barrel fixing base and the focusing lens-barrel, which is closer to the interior of the camera lens or the image capturing device, so that the elastic member has a less chance of receiving light, so as to reduce the chance of having a flare phenomenon.

What is claimed is:

1. A camera lens, comprising:
   a lens-barrel fixing base, having a hollow part disposed at a central position of the lens-barrel fixing base, a first supporting part disposed in a peripheral area of the hollow part, and a connecting part disposed at an external periphery of the first supporting part;
   a driving barrel, being a hollow barrel structure, and having a groove formed at an inner wall of the driving barrel, and the driving barrel being disposed in a fixing barrel, and an end of the fixing barrel being coupled to the connecting part;
   a focusing lens-barrel, being a hollow barrel structure, and having a guiding part disposed on an external wall of the focusing lens-barrel and inserted into the groove, such that the focusing lens-barrel is able to be disposed and axially moved in the driving barrel, and a second supporting part being disposed at an inner wall of the focusing lens-barrel; and
   an elastic member, being a hollow-ring structure axially extendible and contractible, and being disposed between the lens-barrel fixing base and the focusing lens-barrel, one end of the elastic member fixed to and supporting the first supporting part of the lens-barrel fixing base, and another end of the elastic member fixed to and supporting the second supporting part of the focusing lens-barrel, and a radial cross-sectional area at the end of the elastic member being greater than a radial cross-sectional area at the another end of the elastic member;
   wherein the elastic member has a non-stretched length smaller than a distance between the first supporting part of the lens-barrel fixing base and the second supporting part of the focusing lens-barrel.

2. The camera lens of claim 1, wherein the elastic member supports the focusing lens-barrel, and the guiding part of the focusing lens-barrel is positioned against a side of the groove of the driving barrel.

3. The camera lens of claim 1, wherein the elastic member is a spring.

4. The camera lens of claim 1, wherein when the driving barrel is moved and rotated clockwise or counterclockwise, the guiding part of the focusing lens-barrel is moved along the groove to drive the focusing lens-barrel to move for a focusing operation.

5. An image capturing device, comprising:
   a camera lens, comprising:
      a lens-barrel fixing base, having a hollow part formed at a central position of the lens-barrel fixing base, a first supporting part formed in a peripheral area of the hollow part, and a connecting part disposed at an external periphery of the first supporting part;
      a driving barrel, being a hollow barrel structure, and having a groove formed at an inner wall of the driving barrel, and the driving barrel being disposed in a fixing barrel, and an end of the fixing barrel being coupled to the connecting part;

a focusing lens-barrel, being a hollow barrel structure, and having a guiding part formed at an external wall of the focusing lens-barrel and inserted into the groove, such that the focusing lens-barrel is able to be disposed and axially moved in the driving barrel; and a second supporting part being disposed at an inner wall of the focusing lens-barrel; and an elastic member, being a hollow-ring structure axially extendible and contractible, and being disposed between the lens-barrel fixing base and the focusing lens-barrel, one end of the elastic member fixed to and supporting the first supporting part of the lens-barrel fixing base, and another end of the elastic member fixed to and supporting the second supporting part of the focusing lens-barrel, and a radial cross-sectional area at the end being greater than a radial cross-sectional area at the another end;

a zooming lens-barrel, disposed in the driving barrel, and located at an end of the focusing lens-barrel and away from the lens-barrel fixing base; and an image sensor, disposed at the first supporting part of the lens-barrel fixing base and surrounded by the elastic member;

wherein the elastic member has a non-stretched length smaller than a distance between the first supporting part of the lens-barrel fixing base and the second supporting part of the focusing lens-barrel.

6. The image capturing device of claim 5, wherein the elastic member supports the focusing lens-barrel, such that the guiding part of the focusing lens-barrel is positioned against a side of the groove of the driving barrel.

7. The image capturing device of claim 5, wherein the elastic member is a spring.

8. The image capturing device of claim 5, wherein when the driving barrel is driven to move and rotate clockwise or counterclockwise by a driving module, the guiding part of the focusing lens-barrel is moved along the groove to drive the focusing lens-barrel to move for a focusing operation.

* * * * *